United States Patent [19]

Bertorelli et al.

[11] 4,133,694

[45] Jan. 9, 1979

[54] METHOD FOR REDUCING AGGREGATE SIZE

[75] Inventors: Orlando L. Bertorelli, Havre de Grace; Robert C. Fitton, Bel Air, both of Md.

[73] Assignee: J. M. Huber Corporation, Locust, N.J.

[21] Appl. No.: 817,753

[22] Filed: May 3, 1976

Related U.S. Application Data

[63] Continuation of Ser. No. 473,259, May 24, 1974, abandoned.

[51] Int. Cl.$^2$ .............................................. C09C 1/28
[52] U.S. Cl. .............................. 106/288 B; 106/309
[58] Field of Search ............... 106/288 B, 72, 309; 241/21, 22

[56] References Cited

U.S. PATENT DOCUMENTS

| | | | |
|---|---|---|---|
| 2,361,059 | 10/1944 | Robertson | 106/309 |
| 2,581,414 | 1/1952 | Hochberg | 106/309 |
| 2,855,156 | 10/1958 | Hochberg et al. | 106/309 |

Primary Examiner—Winston A. Douglas
Assistant Examiner—J. V. Howard
Attorney, Agent, or Firm—Harold H. Flanders

[57] ABSTRACT

A method of improving opacity and brightness of paper containing synthetic sodium magnesium alumino silicate, sodium alumino silicate and silicic acid or silica pigments which utilizes reducing the structure of such pigments by hard media grinding.

1 Claim, 4 Drawing Figures

METHOD FOR REDUCING AGGREGATE SIZE

This is a continuation of application Ser. No. 473,259, filed May 24, 1974, now abandoned.

BACKGROUND OF THE INVENTION

This invention relates to comminuted synthetic pigments and more particularly relates to a reduced structure silica or silicate pigment.

The art of adding fillers to various grades of paper dates back to the ancient days of paper making. Today, fillers such as titanium dioxide, synthetic sodium alumino silicates, clay, diatomaceous silica, calcium sulfate, calcium carbonate, calcium sulfite, calcium silicate, talc, etc. are used as fillers for various grades of paper. When used in the proper amounts, the pigment filler improves the quality of the paper and its optical properties. Fillers as a general rule are highly desirable in printing papers where they increase the brightness, opacity, and improve the surface and printability of the sheet.

Pigments are usually considered to be satisfactory for filling when they have a high degree of whiteness, a high index of refraction, small particle size, low solubility in water, chemical inertness, and low specific gravity. However, recent studies have shown that these criteria alone are not sufficient to predict the performance of a pigment in paper. Only when actually tested can the value of a pigment be determined.

The most-sought-after fillers for high quality paper or publication stock are those which improve the optical qualities of the sheet and reduce ink show-through at a relatively low pigment loading.

Usually, the most desirable filler pigments such as titanium dioxide and sodium alumino silicates are also the most expensive to manufacture and purchase. Clay and calcium carbonate are also used as fillers for publication stocks.

Titanium dioxide is particularly successful as a filler pigment in high quality papers because of the whiteness of the pigment and the brightness and opacity it imports to paper. Unfortunately the cost of titanium dioxide is prohibitive in many situations where its desirable properties could be utilized.

A pigment which comes close to performing as well as titanium dioxide and which may be used to extend titanium dioxide is synthetic sodium alumino silicate. This pigment imparts comparable high brightness and opacity to paper at a lower cost than titanium dioxide.

Paper manufacturers are still, of course, in need of lower cost pigments than the synthetic sodium alumino silicates now being used but with equal or greater brightness and opacity when used in high quality papers and publication stocks.

SUMMARY OF THE INVENTION

Accordingly, it is an object of this invention to provide a new method of improving the optical properties of synthetic sodium alumino silicates when used in paper.

It is a further object of this invention to provide a reduced structure synthetic sodium alumino silicate exhibiting improved brightness, whiteness and opacity when added to paper.

Other objects and a fuller understanding of the invention may be had by referring to the following description and claims taken in conjunction with the accompanying drawings.

The present invention overcomes the deficiencies of the prior art and achieves its objectives by providing a method of reducing the structure of synthetic sodium alumino silicates by subjecting aqueous suspensions of said synthetic sodium alumino silicates or mixtures of sodium alumino silicates, silica pigments, and kaolin clay to an agitation process in the presence of hard microspheroidal grinding media.

BRIEF DESCRIPTION OF THE DRAWINGS

In order to facilitate the understanding of this invention, reference will now be made to the appended drawings of preferred embodiments of the present invention. The drawings should not be construed as limiting the invention but are exemplary only. In the drawings.

DESCRIPTION OF THE PREFERRED EMBODIMENTS

Figure 1:
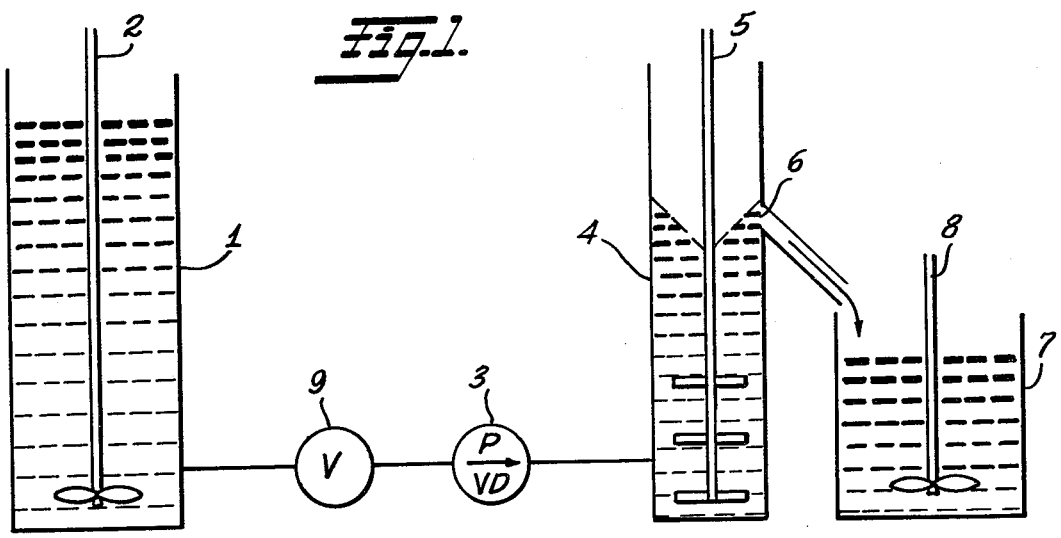
FIG. 1 is a schematic representation of the typical apparatus to be used to carry out the process of this invention.

In a preferred embodiment of the present invention a synthetic sodium alumino silicate filter cake slurry is agitated in a mixing vessel with from 20 to 80% glass microspheroids based on the total volume of the slurry suspension.

Suitable sodium alumino silicate filter cake slurries may be prepared according to the teachings of U.S. Pat. Nos. 3,149,024; 2,379,073; or 2,848,346.

The pigment fillers on which this process is useful are inorganic siliceous pigments of fine particle size, usually within the 0.01 to 0.6 micron range. The siliceous pigments with silanol groups on the surface thereof are those most advantageously used since they have a tendency to attach chemically as well as physically to the cellulosic fibers, assuring even distribution throughout the paper with high retention.

These pigments can be characterized as those amorphous siliceous pigments containing at least 50% $SiO_2$ and at least 3.5% bound water. They can be made by precipitating $SiO_2$ from sodium silicate by means of acids or in the manner described in U.S. Pat. Nos. 3,034,913 and 3,034,914 wherein sodium silicate is partially neutralized with acid, and silica is thereafter precipitated therefrom with an acid salt such as calcium chloride or alum.

Other suitable siliceous fillers are made by precipitating silica from calcium silicate with acid in the manner described in U.S. Pat. No. 3,110,606.

Another suitable siliceous filler is calcium silicate prepared by a hydrothermal pressure reaction of lime and diatomaceous earth.

Another preferred filler is the series of synthetic sodium alumino silicate pigments described in U.S. Pat. Nos. 2,739,073 and 2,848,346. These fillers are prepared by suitably commingling and reacting together at low concentration, aqueous solutions of an alkali metal silicate and a water-soluble aluminum salt such as aluminum sulfate, aluminum chloride, aluminum nitrate or ammonium alum.

Other conventionally used fillers having structure for newsprint and other lightweight papers can be used in this invention. Combinations of siliceous fillers are also suitable, for example, mixtures of synthetic silica pigments (as disclosed in U.S. Pat. Nos. 3,328,124 and 3,328,125) and sodium alumino silicate.

The pH of the reaction medium, as well as the precipitating pH, and the type of silicate used are among the factors which determine the specific sodium alumino silicate produced. A variation in these factors determines the molar ratios of the oxides of sodium, aluminum, and silicon, as well as the particle size, specific gravity, and surface area of the pigment. Pigments with molar ratios of above 0.8 mole of $Na_2O$ per mole of $Al_2O_3$ and over 4 moles of $SiO_2$ per mole of $Na_2O$ with a particle size of less than 0.14 micron in diameter, a specific gravity of 2.10 to 2.26 and a surface area greater than 20 square meters per gram are useful in the practice of this invention.

While many useful white paper pigments are known, the siliceous pigments such as those in the above-designated patents are particularly useful in the practice of this invention since they are characterized by similar morphological makeup; i.e., they are composed of amorphous spherical particles having a grape cluster type structure. It is the combination of their morphology together with surface area, particle size, refractive index, and pigment brightness which interact to contribute to the improved optical and printing properties each imparts to paper.

The raw final product of the above-described chemical processes is a moist filter cake of sodium alumino silicate aggregates and water. The aggregates consist of grape cluster type structures of several of the spherically shaped elementary pigment particles joined together along with a quantity of entrapped water.

To obtain a finished pigment suitable for use in papers and for coating papers, the filter cake is spray dried and then micromilled to reduce aggregate size of the pigment structure. When it is shipped or transported, it is usually reslurried in water. This is a costly process and requires excessive process steps and production time to complete.

The present invention discloses a method of reducing the grape cluster type structure of sodium alumino silicates while the pigment is still in the raw filter cake slurry thereby eliminating or expediting the steps of spray drying, micromilling and then reslurrying. The present invention also discloses a method of reducing structure which is more efficient, requires less power input, and produces less contamination of the pigment while producing a pigment with improved paper opacity and brightness properties.

By grinding the wet pigment filter cake and then filtering on a fine mesh screen instead of drying the filter cake and then milling and reslurrying, a saving of time and processing is accomplished.

By grinding with glass microspheroids, the solids content of the pigment filter cake slurry can be increased from 27% for the unground pigment to around 40% for the ground pigment produced by either filtering or by dry feed back.

This is believed to be due to the release of entrapped water in the aggregate and it allows a reduction in shipping cost due to the increased content of solids in a given volume of the slurry.

The contamination is reduced because the glass microspheroids are chemically inert and have a high crush strength, whereas a high speed milling process such as micromilling may result in metal contamination of the pure white pigment which could cause discoloration.

Grinding media found to be suitable are microspheroids of aluminum magnesium alloys, alloys of zirconium, chromanite, alloy steel beads, and ceramic beads. These give a microspheroid of favorable density (specific gravity between 2 and 3), sufficient hardness, and non-abrasiveness to the vessels and machinery.

A media found to be particularly adapted for this type of work are glass microspheroids.

The most favorable and economical grinding media consists of microspheroids of a glass having a specific gravity of around 2.45 to 3.0. These microspheroids exhibited a high crush strength and low abrasion effect on the vessels and machinery.

These glass microspheroids have been found to provide a faster grinding rate than materials such as sand and plastic due to their hardness and spherical nature which provides better contact. As compared to sand, they have a lower specific gravity, are easier to suspend, and, thus, require less power in mixing. Glass microspheroids have a higher crush strength and therefore provide less contamination than sand. They are more homogeneous in structure and, in general, have less fractures or fissures to weaken them and cause breakage. Also, a variety of glass microspheroids are commercially available with a more uniform spherical shape which results in faster grinding and better contact of the media. In addition to the before-mentioned variables, such as the media/slurry ratio agitation speed, etc., various effects may be obtained by balancing size versus the number or frequency of impingements. Thus, glass microspheroids permit somewhat tailored results by allowing various sized distributions of the microspheroids to be used. One can achieve optimum effects by proper selection of their size. An increase in the size of media yields larger grinding intensity and forces but fewer impingements. Further, the microspheroids provide for better intermittent operation because they are easier to resuspend on start-up. In summary, they provide high strength and wear resistance and are inert and non-contaminating. As set forth above, the specific gravity of the media should be greater than that of the pigment water suspension. A typical slurry containing 30% solids may have a specific gravity of approximately 1.225 whereas the preferred media generally has a specific gravity of about 2-3.

A media suitable for use in the present invention is that identified as Class IV, Type 203 Uni-Spheres, manufactured by the Microbeads Division of Cataphote Corporation, which consists of microspheroids having a specific gravity of about 2.45 and a diameter in the range of about 20 mesh to 30 mesh (Tyler standard screen scale). Siliquartzite, beads of hard glass, by Drais Wannheim, W. Germany, having a diameter in the range of 0.75–5mm and a specific gravity of 2.9 and Ceramedia beads from Quackenbush Co., Arlington Heights, Ill. having a diameter on the order of 2.8 mm and a specific gravity of 2.6 are also satisfactory.

It has been discovered that the use of glass media, as heretofore described, permits substantially complete reduction to the required fineness in one pass, in contrast to known processes wherein a portion of the ground material must be recycled to the grinding apparatus or discarded. While other media, such as Ottawa sand and small fused alumina spheres, may be employed, such media having a greater specific gravity are more difficult to suspend, require more power in mixing and do not otherwise offer the unique advantages of the glass microspheroids.

In the following examples the pigment filter cake slurries were ground in the apparatus shown in FIG. 1. In general any conventional tank or vessel equipped with agitating means, etc., may be employed in practicing the structure reduction step of the present invention. Suitable apparatus are disclosed in U.S. Pat. Nos. 3,075,710 and 3,171,718. Preferably, the vessel and agitator are covered with rubber or other suitable elastomer to avoid corrosion and wear of the metal parts.

The invention will be further illustrated by the following specific working examples which set forth particularly advantageous method embodiments employed in the reduction of structure in accordance with the present invention. Unless otherwise indicated, the apparatus employed in the structure reduction is substantially that as illustrated in FIG. 1. The slurry agitation was effected in a vessel indicated generally at 4, said vessel being provided with a cross-arm impeller 5. In the case of batchwise agitation, the slurry and grinding medium were placed directly into the vessel 4 and agitated for a period sufficient to effect the degree of structure reduction desired. Separation of the ground slurry from the media was effected by screening. In the case of continuous operation, the grinding procedure was the same as that in the batchwise procedure. In this case, however, after reducing the initial charge of slurry in the vessel 4 to the desired fineness, the flow of feed slurry from the feed tank 1 was initiated by opening valve 9. The rate of feed flow into the vessel 4 was thereafter controlled by a variable speed pump 3 to provide the necessary retention time in the vessel 4. The slurry overflowed the mixing tank through a screen 6 or similar functional means which serve to retain the grinding media in the vessel. The slurry was then collected in tank 7.

EXAMPLE 1

To the vessel 1 was added 1575 ml of wet filter cake of Zeolex, a synthetic amorphous sodium alumino silicate manufactured by the J. M. Huber Corporation, at 27% solids content, and 1975 ml. of dry, 20 mesh glass microspheroids. A portion of the wet filter cake slurry was set aside, without grinding, as a control. The ground samples were filtered through a 60 mesh screen to separate the microspheroids.

The mixture of filter cake and microspheroids was agitated at a speed of from 700 to 1400 RPM for periods of 0.7 to 4.3 minutes with the volume ratio of microspheroids to filter cake slurry varying from 1.2 to 1.8:1.

Figure 2:
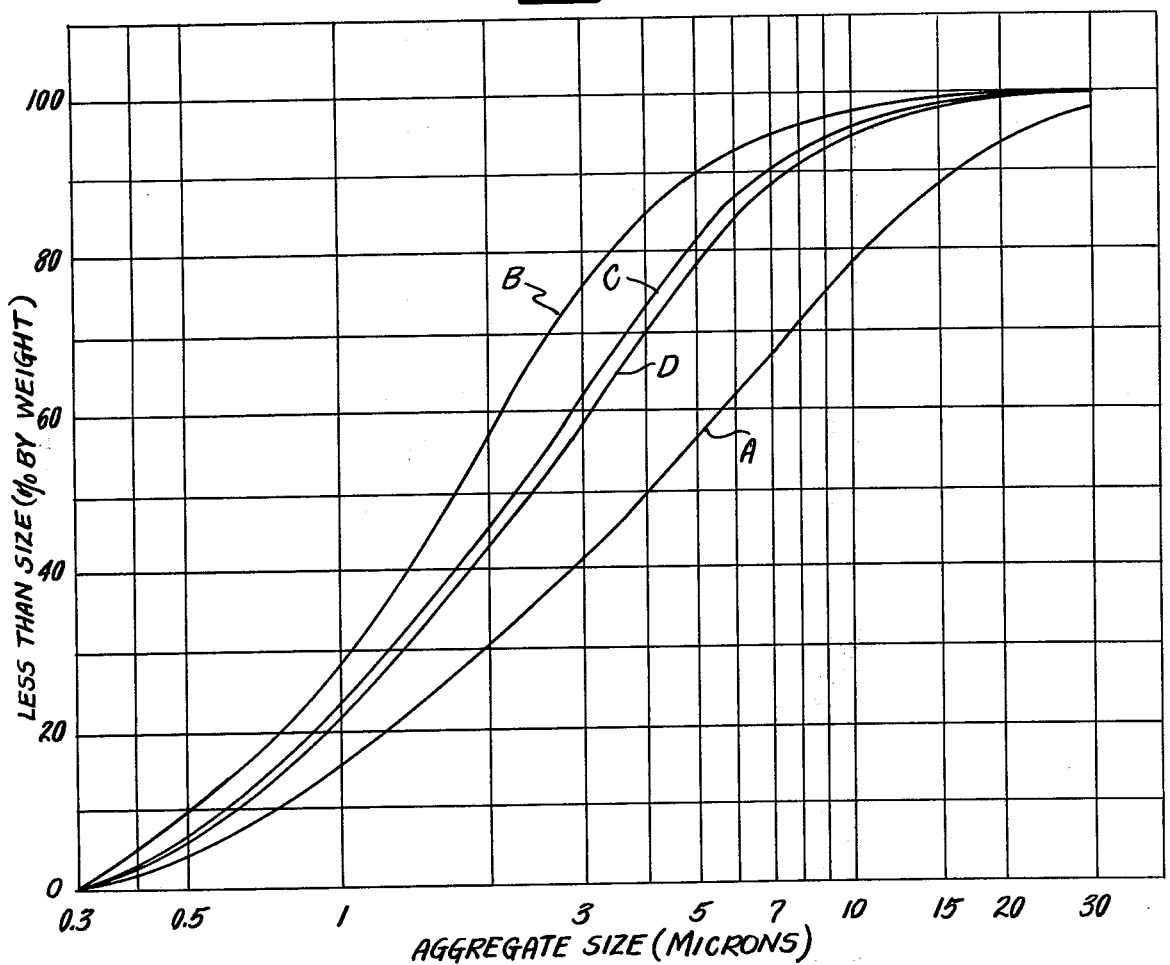
FIG. 2 is a graph showing the improvements in particle size obtained in utilizing the present process on sodium alumino silicate as a function of agitation time.

In FIG. 2 the agitator speed was held constant at 1000 RPM and the volume ratio of microspheroids to slurry was maintained at about 1.3 to 1. The agitation time was varied from 0.7 to 4.6 minutes and the effect on aggregate particle size distribution is shown.

The unground control sample, curve A, showed the coarsest aggregates and the ground filter cake slurry which was agitated for 4.6 minutes, curve B, exhibited the finest particle size distribution. As the agitation time was decreased, the particle size distribution became coarser. The sample which was ground 2.3 minutes, curve C, was the nearest to curve B in structure reduction.

Curve D, representing a grinding time of only 0.7 minutes was very near the curve for a grinding time of 2.3 minutes, curve C.

All three of the ground filter cake samples, represented by curves B, C, and D, experienced a greater structure reduction and finer particle size than the unground control.

EXAMPLE 2

Figure 3:
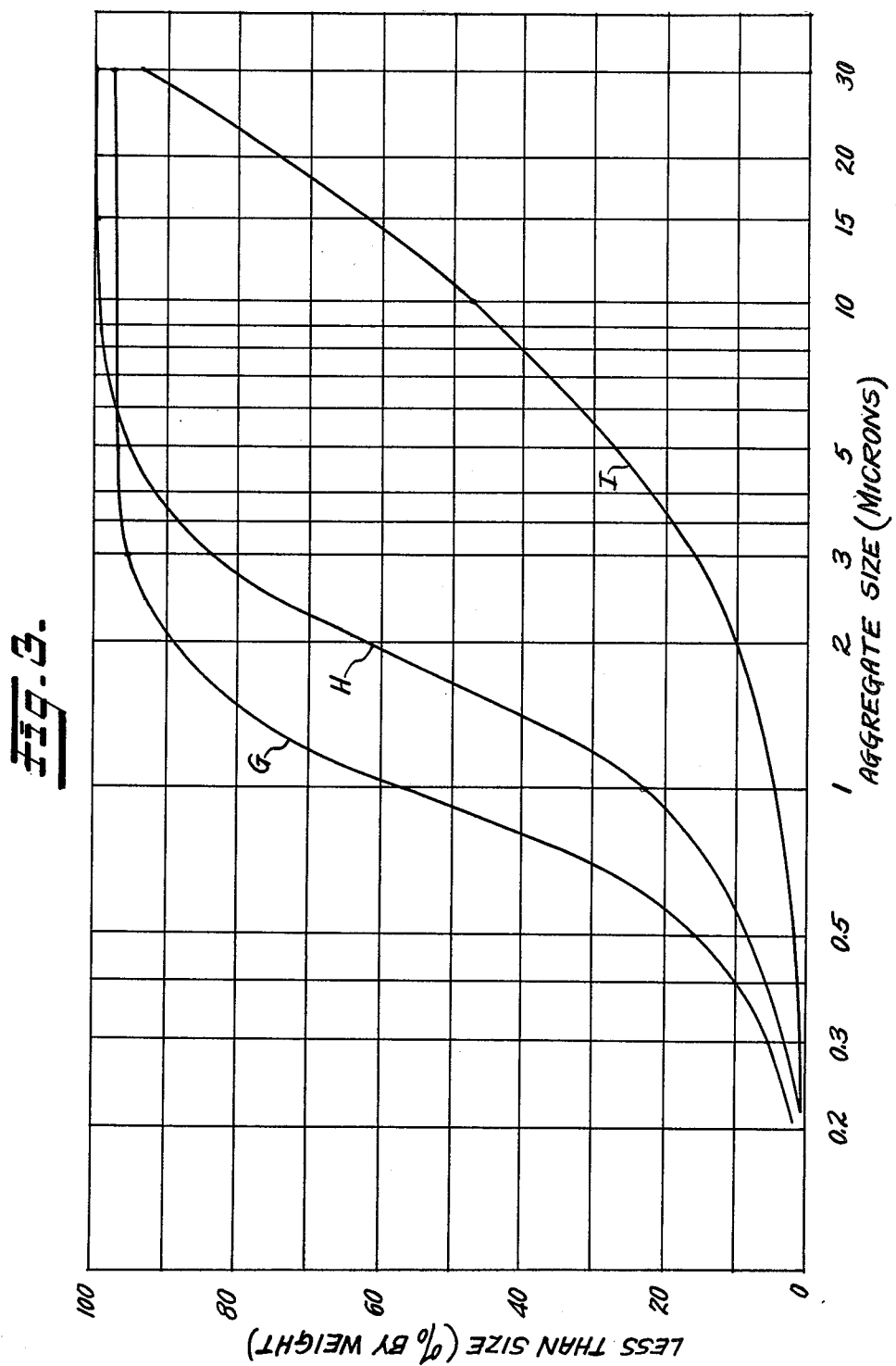
FIG. 3 is a graph showing the effect on particle size of varying the ratio of microspheroids to pigment in the suspension being agitated.

FIG. 3 illustrates the reduction in aggregate sizes with varying ratios of glass microspheroids and filter cake slurry. Curve I represents the control sample which was not subjected to grinding and therefore has a distribution of relatively coarse aggregates. Curves G and H represent the ground samples and illustrate the reduction in aggregate structure obtained with the grinding process. Curve H represents a lower volume ratio (1.2) of microspheroids to slurry and, therefore, a sample which has undergone less structure reduction than that of curve G, which had a greater volume ratio of microspheroids (1.8) present in the grinding.

The agitator speed was held constant at 1000 RPM as was the grinding time of 2.5 minutes. The greatest structure reduction occurred from increasing the loading of glass microspheroids in the grinding process.

EXAMPLE 3

Figure 4:
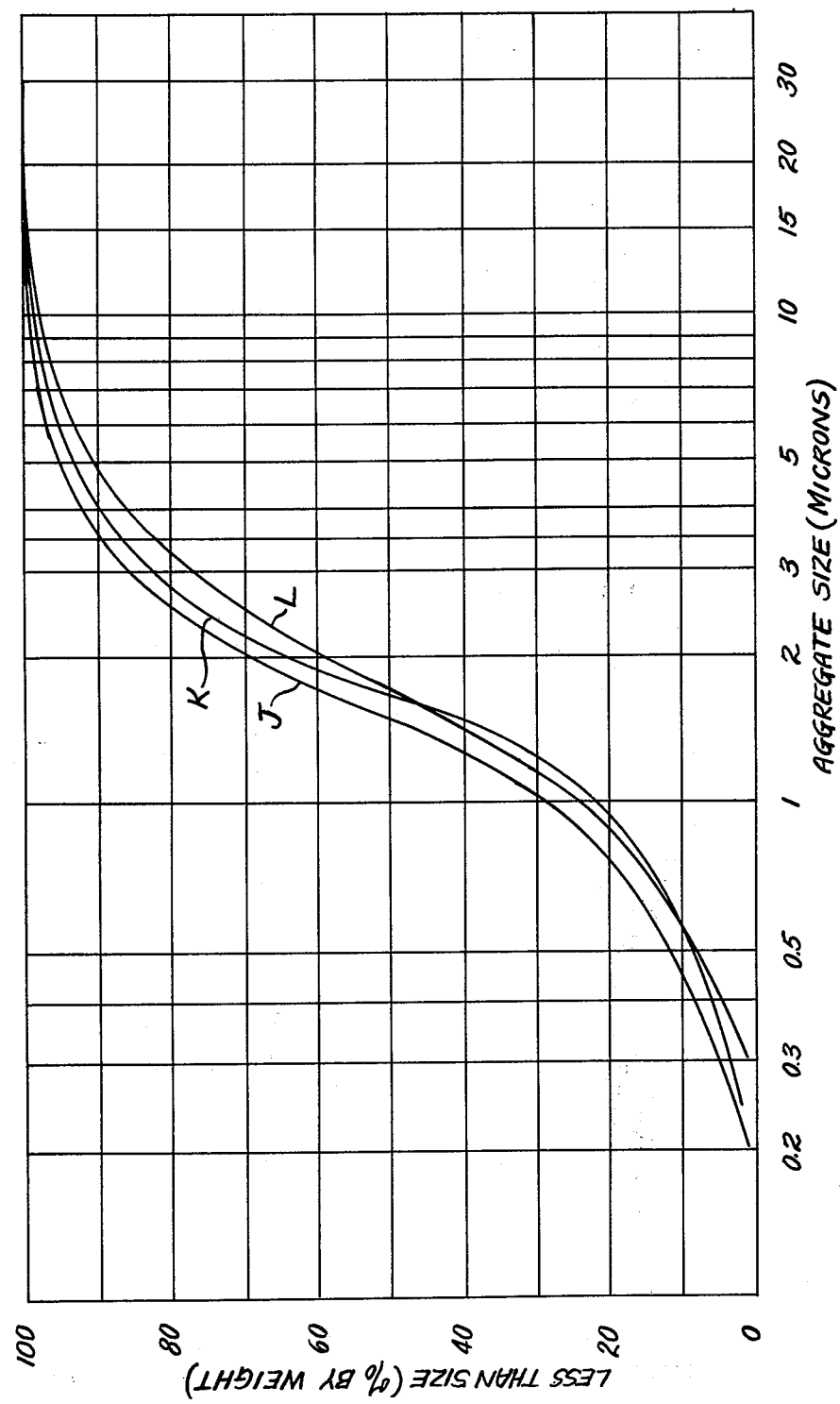
FIG. 4 is a graph showing the effect on particle size of varying agitator speed in the agitation of the aqueous suspension.

In FIG. 4, the agitator speed was varied and grinding time and grinding media loading were maintained constant at 2.5 minutes and 1.3 to 1, respectively. The agitation speeds were 700, 1000, and 1250 RPM. As is clearly shown, increasing agitation speed slightly increased the amount of structure reduction attained during a given period of time. Curve J, which represented the highest agitation rate, 1250 RPM, also showed the greatest amount of structure reduction for a given period of time.

EXAMPLE 4

In the following Table I, the paper properties of the ground pigments are compared to those of the unground control sample. The ground pigments were prepared with varying grinding times and a constant grinding speed of 1000 RPM and constant grinding media/slurry ratio of about 1.3 to 1.

A standard laboratory paper testing procedure was used to determine the fine paper retention, brightness, and opacity of papers containing the novel reduced structure pigments.

Fifty pounds basis weight (25" × 38" — 500) handsheets were made and tested as follows:

The furnish was 50-50 hardwood-softwood kraft at 300 cc Canadian freeness with a pH of 4.5. The pulp was added to a Noble wood proportionater. The pigment slurry was also added to the proportionater to obtain handsheets containing 3, 6, and 9% loadings. After the handsheets were formed in the deckel box, they were pressed between felts and then dried on a steam heated drum dryer.

The filler content was calculated by ashing the trimmings of each handsheet. Paper brightness was measured on Elrepho brightness meter at 457 millimicrons. The paper opacity was determined on a Bausch and Lomb opacity meter at 567 millimicrons.

From Table I, it can be seen that the brightness and opacity of papers at low loading levels of 3% and 6% fillers are improved and are equal or improved at 9% filler loading by the use of the present invention.

With a grinding time of 0.7 minute, the TAPPI brightness of the ground sample at 3% loading was 0.9 of a point higher than the unground sample at the same loading rate; and at the 6% level, was 0.7 of a point higher. The 9% level showed an increase of 0.5 of a point. All of these increases in brightness are significant improvements because at this range of brightness even very minor increases in brightness are difficult to obtain.

Also clearly shown in Table I is the gain in filter cake solids possible with this invention. The unground sample of Zeolex filter cake had a 26.9% solids content and the filter cake of the sample ground for 4.6 minutes had a solids content of 33.7%, a gain of 6.8% in percent solids content, or more than one-fourth again as much as the unground sample.

EXAMPLE 5

In Table II the effects of changing the ratio of grinding media to filter cake slurry was investigated in Samples A and B and the effect of increasing agitator speed was investigated in Samples C through F. The control sample was Sample G.

From the comparison of samples A and B, it can be seen how much the paper properties of the ground pigment vary with the concentration of grinding media used. The brightness has increased at least 0.9 of a point at all three paper loading levels when the grinding media to filter cake slurry ratio was increased from 1.2 to 1.8.

The paper opacity remained unchanged but a significant increase in percent wet cake solids was realized.

Samples C through F and the control sample G illustrate the slight changes in paper properties that result from changing the agitator speed.

At 700 RPM a significant increase is seen over the properties of the control sample. At 1000 RPM, the brightness and opacity begin to show a slight increase and at 1250 RPM the brightness and opacity show a significant increase over the control sample especially at low pigment loading levels from 3% to 6%.

At 1400 RPM, the paper properties began to degrade indicating that the reduction of the structure has passed an optimum point and the pigment aggregates are becoming too small to be retained in the paper.

EXAMPLE 6

Table III compares the control sample with samples ground with 2 mm microspheroids rather than the 1 mm size in the previous tables. The grinding time was varied from 0.7 to 4.6 minutes. Also for comparison purposes values are given for a commercial pigment laboratory standard, a synthetic sodium alumino silicate manufactured by the J. M. Huber Corporation.

Thus in Table III, it can be clearly seen that the process of hard media grinding with 2 mm microspheroids has achieved a brightness increase and an increase in opacity over the unground control. The samples also exhibited a very significant increase in brightness over a Lab Standard Zeolex pigment, sample E, which is a pigment that has been dried and milled.

Visual observations revealed that the solids in the pigment slurries agitated with 2 mm microspheroids do not settle out as much as those agitated with 1 mm microspheroids.

In summary and as described above, the application of glass bead grinding to pigments, such as Zeolex sodium alumino silicates having a significant structure at least a portion of which is transient, results in marked improvements in fine paper opacity, brightness, retention and the degree of dispersion obtained. These changes producing a more homogeneous product also reduce settling, allow for increased solids content in slurries and stability, and in general produce a pigment slurry equivalent to a spray dried micro-milled reslurried product. The beneficial results are apparently largely derived from the breaking of grape cluster type structure and the release of entrapped water.

As a result an increase of 25–40% solids is possible. The milled slurry also appears to visual observation to be whiter.

The milled slurry has a reduced 325 mesh reside, e.g., 6.17% to 0.2–0.5%, and reduced mean aggregate diameter, e.g., 6.4 microns to 4.1 microns.

The shear applied is a function of the bead velocity in the slurry which is a function of the agitator speed.

Increasing the speed of the agitator, keeping the other variables constant, increases the shear applied, thereby increasing the grinding rate and fineness.

Beyond 1250 RPM no noticeable increase in wet cake solids content was produced, indicating that all transient (i.e., non-permenant) structure has been broken down in Zeolex pigments by the applied bead grinding.

Increasing the volume ratio of glass beads to slurry has a significant effect on the grinding rate. The bead volume to slurry volume ratio may be varied from 0.9 to 2.5 with a ratio on the order of 1.25 preferred. The upper limit of this ratio is reached at 1.8–2.0. Beyond this point the grinding efficiency drops.

Increasing the bead to slurry volume ratio increases the number of smaller aggregates produced.

Increasing grinding time decreases the 325 screen residue and increases the solids content of the refiltered filter cake slurry.

Aggregate size distribution data show a reduction in the size of the aggregates with increasing grinding time; for example the percentage of aggregates less than 7 microns is increased from a control of 65% to 86% with 0.7 minute grinding and to 94% with 4.3 minutes grinding.

The 325 mesh screen residue is decreased from a control value of 6.1% to 2.25% in 17.1 seconds of grinding, to 0.42% in 21.4 seconds of grinding, to 0.27% in 34.2 seconds of grinding.

Overgrinding to a point where excessive bead wear (e.g., in excess of 0.2 lbs/ton) or a significant reduction in single pass retention in paper (e.g., 20–30% reduction) takes place should of course be avoided. In general, grinding to a 325 mesh screen residue less than 0.17% indicates such overgrinding.

Although a specific preferred embodiment of the present invention has been described in the detailed description above, the description is not intended to limit the invention to the particular forms or embodiments disclosed herein, since they are to be recognized as illustrative rather than restrictive and it will be obvious to those skilled in the art that the invention is not so limited. For example, the present invention could be utilized to improve the optical and paper properties of other types of sodium alumino silicates than those described herein or may be used on pigments other than sodium alumino silicates, such as other sodium silicates.

It is also contemplated that the process may be used on pigments containing extenders.

The invention is declared to cover all changes and modifications to the specific examples of the invention herein disclosed for the purposes of illustration which do not constitute departures from the spirit and scope of the invention.

TABLE I
FINE PAPER PROPERTIES OF GROUND ZEOLEX FILTER CAKE SLURRY USING 2 mm GLASS MICROSPHEROIDS

| Sample | Grinding Time Min. | %325 Screen Residue | % Wet Cake Solids | % Filler | TAPPI Brightness |
|---|---|---|---|---|---|
| Unground Zeolex Filter Cake Slurry (Control) | — | 2.12 | 26.9 | Unfilled | 86.0 |
| | | | | 3 | 86.5 |
| | | | | 6 | 87.3 |
| | | | | 9 | 88.1 |
| Ground Zeolex Filter Cake Slurry | 0.7 | 0.13 | 32.8 | 3 | 87.4 |
| | | | | 6 | 88.0 |
| | | | | 9 | 88.6 |
| Ground Zeolex Filter Cake Slurry | 2.3 | 0.02 | 33.0 | 3 | 87.3 |
| | | | | 6 | 88.2 |
| | | | | 9 | 88.5 |
| Ground Zeolex Filter Cake Slurry | 4.6 | 0.01 | 33.7 | 3 | 87.1 |
| | | | | 6 | 88.1 |
| | | | | 9 | 88.3 |

TABLE II
FINE PAPER PROPERTIES AND WET CAKE SOLIDS OF GROUND ZEOLEX REACTION SLURRY USING 1 mm GLASS MICROSPHEROIDS

| Sample | Volume Ratio Grinding Media/slurry | Grinding RPM | Grinding Time Min. | % Wet Cake Solids | % Filler | TAPPI Brightness | TAPPI Opacity |
|---|---|---|---|---|---|---|---|
| A. Ground Zeolex Slurry | 1.2 | 1000 | 2.5 | 35.7 | 3 | 86.5 | 83.8 |
| | | | | | 6 | 87.5 | 85.7 |
| | | | | | 9 | 88.2 | 86.8 |
| B. Ground Zeolex Slurry | 1.8 | 1000 | 2.5 | 39.6 | 3 | 87.4 | 83.8 |
| | | | | | 6 | 88.5 | 85.7 |
| | | | | | 9 | 89.1 | 86.8 |
| C. Ground Zeolex Slurry | 1.2 | 700 | 2.5 | 32.2 | 3 | 86.4 | 83.7 |
| | | | | | 6 | 87.3 | 85.6 |
| | | | | | 9 | 88.0 | 86.9 |
| D. Ground Zeolex Slurry | 1.2 | 1000 | 2.5 | 35.7 | 3 | 86.5 | 83.8 |
| | | | | | 6 | 87.5 | 85.7 |
| | | | | | 9 | 88.2 | 86.8 |
| E. Ground Zeolex Slurry | 1.2 | 1250 | 2.5 | 38.1 | 3 | 87.1 | 83.5 |
| | | | | | 6 | 88.2 | 85.7 |
| | | | | | 9 | 88.7 | 86.8 |
| F. Ground Zeolex Slurry | 1.2 | 1400 | 2.5 | 38.0 | 3 | 87.0 | 83.6 |
| | | | | | 6 | 88.2 | 85.6 |
| | | | | | 9 | 88.5 | 86.5 |
| G. Unground Zeolex Slurry, Control | — | — | — | 26.6 | 3 | 86.5 | 82.8 |
| | | | | | 6 | 87.3 | 85.8 |
| | | | | | 9 | 88.1 | 87.1 |

TABLE III
FINE PAPER PROPERTIES OF GROUND ZEOLEX FILTER CAKE SLURRY USING 2 mm GLASS MICROSPHEROIDS

| Sample | Grinding Time Min. | % Filler | TAPPI Brightness | TAPPI Opacity |
|---|---|---|---|---|
| A. Unground Zeolex Filter Cake Slurry (Control) | — | Unfilled | 86.0 | 80.3 |
| | | 3 | 86.5 | 82.8 |
| | | 6 | 87.3 | 85.8 |
| | | 9 | 88.1 | 87.1 |
| B. Ground Zeolex Filter Cake Slurry | 4.6 | 3 | 87.1 | 83.5 |
| | | 6 | 88.1 | 86.0 |
| | | 9 | 88.3 | 87.2 |
| C. Ground Zeolex Filter Cake Slurry | 2.3 | 3 | 87.3 | 83.6 |
| | | 6 | 88.2 | 85.9 |
| | | 9 | 88.5 | 87.2 |
| D. Ground Zeolex Filter Cake Slurry | 0.7 | 3 | 87.4 | 83.2 |
| | | 6 | 88.0 | 86.0 |
| | | 9 | 88.6 | 87.0 |
| E. Laboratory Standards | — | 3 | 86.4 | 83.5 |
| | | 6 | 86.9 | 86.2 |
| | | 9 | 87.6 | 87.3 |

What is claimed is:

1. A method of improving optical and paper properties of sodium alumino silicate pigments having transient structure comprising the steps of:
   (a) forming a wet sodium alumino silicate filter cake slurry containing from 25% to 40% solids;
   (b) adding glass microspheroids, having a diameter of from 1 to 2 mm and having a specific gravity from 2 to 3, to the wet filter cake slurry in an amount so that the ratio of glass microspheroids to slurry is from 1.2 - 1.8 : 1;
   (c) agitating said wet filter cake slurry and glass microspheroids by stirring with a rotary stirrer for from 0.2 to 7.0 minutes at from 700 to 1250 RPM to reduce the structure of said sodium alumino silicate without significantly altering the particle size distribution; and
   (d) screening said pigment/glass microspheroid mixture to separate said pigment from said glass microspheroids.

* * * * *

UNITED STATES PATENT AND TRADEMARK OFFICE
CERTIFICATE OF CORRECTION

PATENT NO. : 4,133,694

DATED : January 9, 1979

INVENTOR(S) : Orlando L. Bertorelli and Robert C. Fitton

It is certified that error appears in the above-identified patent and that said Letters Patent are hereby corrected as shown below:

Column 1, line 43, "imports" should be -- imparts --.

Column 4, line 35, following "ratio" insert a comma -- , --;
line 49, "pigment water suspension" should be -- pigment/water suspension --.

Column 8, line 7, "producing" should be -- produce --;
line 43, following "example" a comma -- , -- should be inserted.

Column 9, Table I, between lines 15-25, the column of data for "TAPPI Opacity" was omitted and is as follows: --

| Sample | Grinding Time, Min. | % Filler | TAPPI Opacity |
|---|---|---|---|
|  |  | Unfilled | 80.3 |
| Unground Zeolex Filter Cake Slurry (Control) |  | 3<br>6<br>9 | 82.8<br>85.8<br>87.1 |
| Ground Zeolex Filter Cake Slurry | 0.7 | 3<br>6<br>9 | 83.2<br>86.0<br>87.0 |
| Ground Zeolex Filter Cake Slurry | 2.3 | 3<br>6<br>9 | 83.6<br>85.9<br>87.2 |
| Ground Zeolex Filter Cake Slurry | 4.6 | 3<br>6<br>9 | 83.5<br>86.0<br>87.2 |

--

UNITED STATES PATENT AND TRADEMARK OFFICE
CERTIFICATE OF CORRECTION

PATENT NO. : 4,133,694

DATED : January 9, 1979

INVENTOR(S) : Orlando L. Bertorelli and Robert C. Fitton

It is certified that error appears in the above-identified patent and that said Letters Patent are hereby corrected as shown below:

Column 10, Table III-continued, first entry under "% Filler" should be -- Unfilled -- instead of "filled".

Signed and Sealed this

Twenty-sixth Day of June 1979

[SEAL]

Attest:

RUTH C. MASON
Attesting Officer

DONALD W. BANNER
Commissioner of Patents and Trademarks